United States Patent [19]

Hendry

[11] Patent Number: 5,131,226
[45] Date of Patent: Jul. 21, 1992

[54] VARIABLE VOLUME RESERVOIR AND METHOD FOR ITS USE

[75] Inventor: James W. Hendry, Spring Hill, Fla.

[73] Assignee: Milad Limited Partnership, Naples, Fla.

[21] Appl. No.: 649,577

[22] Filed: Mar. 4, 1991

Related U.S. Application Data

[62] Division of Ser. No. 355,857, May 18, 1989, Pat. No. 5,032,345.

[51] Int. Cl.$^5$ .............................................. F16D 31/02
[52] U.S. Cl. ................................. 60/418; 91/4 R
[58] Field of Search ............... 60/413, 415, 416, 418, 60/410, 407, 370; 91/4 R; 417/403; 138/30, 31

[56] References Cited

U.S. PATENT DOCUMENTS

| | | | |
|---|---|---|---|
| 1,976,129 | 10/1934 | Johnson | 60/415 |
| 2,708,949 | 5/1955 | Krapf | 138/31 |
| 2,734,531 | 2/1956 | Bizak | 138/31 |
| 3,070,023 | 12/1962 | Glasgow | 417/397 |
| 3,122,992 | 3/1964 | Kautz | 60/415 |
| 4,014,213 | 3/1977 | Parquet | 138/31 |
| 4,110,981 | 9/1978 | Murphy | 60/415 |
| 4,186,777 | 2/1980 | Klope et al. | 138/31 |
| 4,430,049 | 2/1984 | Aiba | 138/31 |
| 4,432,393 | 2/1984 | Mills | 138/30 |
| 4,611,634 | 9/1986 | Krockewitt et al. | 138/31 |
| 5,026,859 | 6/1991 | Whitehead et al. | 417/392 |

FOREIGN PATENT DOCUMENTS

| | | |
|---|---|---|
| 2716817 | 8/1978 | Fed. Rep. of Germany . |
| 337436 | 4/1904 | France . |
| 2260062 | 8/1975 | France . |
| 0202990 | 4/1986 | France . |
| 2139548 | 11/1984 | United Kingdom . |

Primary Examiner—Edward K. Look
Assistant Examiner—Hoang Nguyen
Attorney, Agent, or Firm—Brooks & Kushman

[57] ABSTRACT

A pressurized fluid reservoir having a variable working volume includes a cylinder body having a fixed storage volume and a first inlet and exhaust structure for allowing a compressible fluid to enter and leave the cylinder. A second inlet and exhaust structure is also provided for allowing a substantially incompressible fluid to enter and leave the cylinder. A first charge mechanism pumps the compressible fluid into the cylinder. A second charge mechanism pumps the substantially incompressible fluid into the cylinder to reduce the cylinder fixed storage volume to a desired working volume into which the compressible fluid can be pumped by the first charge mechanism.

20 Claims, 2 Drawing Sheets

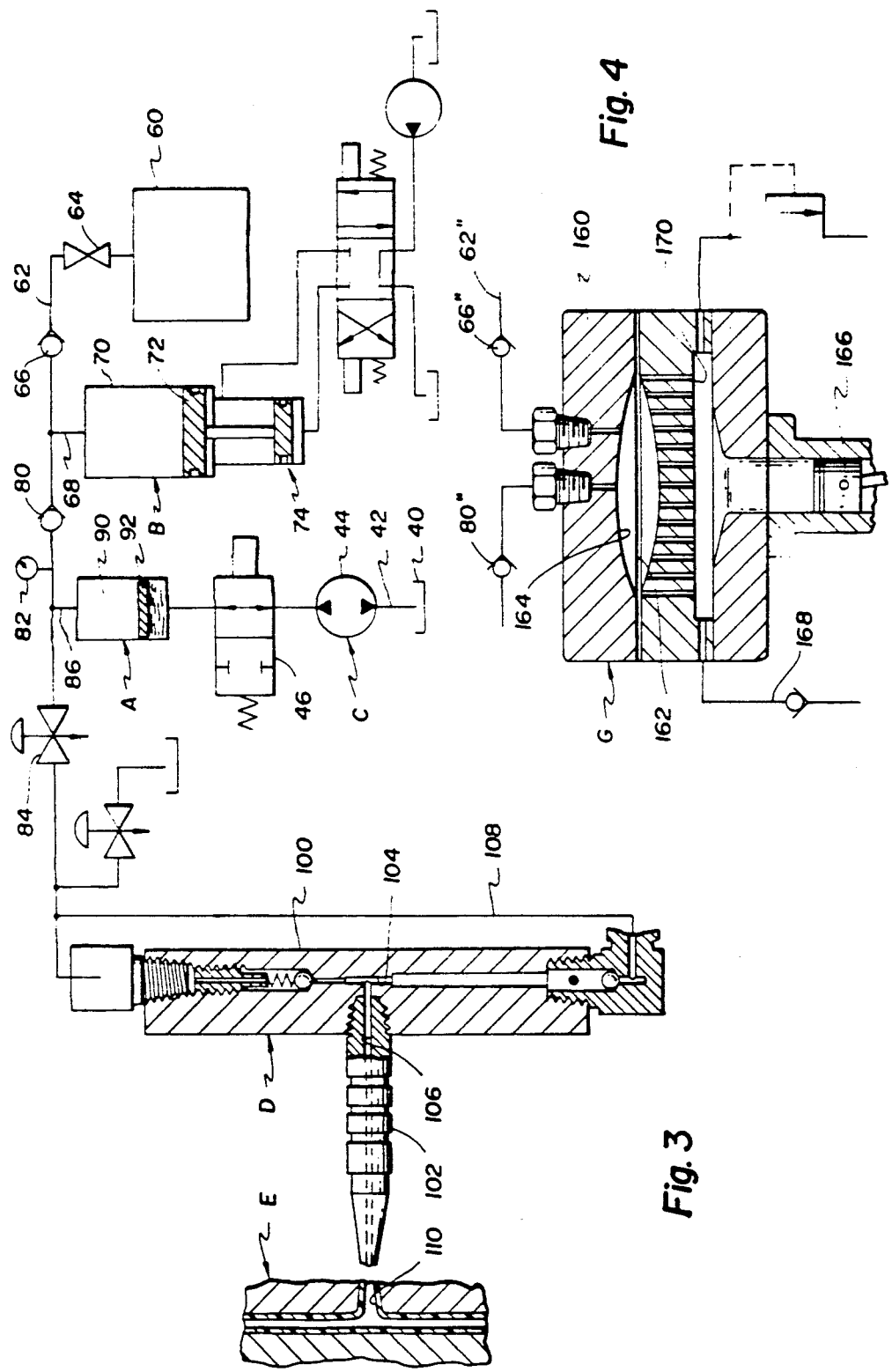

VARIABLE VOLUME RESERVOIR AND METHOD FOR ITS USE

This is a divisional of copending application Ser. No. 0/355,857 filed on May 18, 1989, now U.S. Pat. No. 5,032,345.

BACKGROUND OF THE INVENTION

This invention generally pertains to reservoirs. More specifically, the present invention relates to a compressible fluid reservoir having a variable working volume and a method for its use.

The invention is particularly applicable to a reservoir for storing a pressurized gas wherein the working volume of the reservoir can be selectively changed in order to assure that a desired quantity of gas at a desired pressure is stored in such working volume. However, it will be appreciated by those skilled in the art that the invention has broader applications and may also be adapted for use in many other environments where the storage of fluid under pressure is required.

Pressurized fluid reservoirs for both liquid and gas are known. However, all such reservoirs have a constant or fixed storage volume. In a situation where differing predetermined amounts of gas, or other compressible fluid need to be stored at differing predetermined pressures, the provision of only one reservoir having a fixed storage volume is inadequate. Several sizes of reservoirs would have to be provided in order to allow the approximately correct size to be used when a compressible fluid needs to be stored at differing predetermined volumes and at differing predetermined pressures.

Hydropneumatic or gas-oil accumulators are widely used in industry. These devices provide a smooth even flow of a liquid on demand at a relatively constant pressure thus reducing and possibly eliminating pulsations in liquid lines such as oil or hydraulic fluid lines. The primary use of accumulators is to store a liquid under pressure and the primary use of the stored energy is to supply power at peak system demand. This permits the use of smaller pumps in a system to recharge the accumulator during idle cycle time. In larger accumulators for central hydraulic systems, there is oftentimes no barrier between the pressurizing medium and the system liquid. In the other types of accumulators, a separator is provided between the pressurizing medium, i.e. a gas, and the liquid which is meant to be pressurized. Such liquid is generally an oil, water, or the like. However, accumulators similarly are not reservoirs having variable storage volumes for holding a compressible fluid since the object of these devices is to store a liquid under the pressure provided by a gas.

Conventional reservoirs also do not allow a compressible fluid which is initially stored at a relatively high pressure to be reduced quickly in pressure once the compressible fluid begins to flow out of the reservoir by enlarging the storage volume of the reservoir as the compressible fluid continues to flow. This would allow an initial release of compressible fluid at a relatively high pressure and a continuing flow of fluid at a rapidly decreasing pressure. Such fluid flow is considered to be advantageous in certain processes such as gas injection molding of thermoplastic materials.

Accordingly, it has been considered desirable to develop a new and improved reservoir for a compressible fluid which would overcome the foregoing difficulties and others and meet the above-stated needs while providing better and more advantageous overall results.

BRIEF SUMMARY OF THE INVENTION

In accordance with the present invention, a new and improved reservoir for a compressible fluid is provided. The reservoir advantageously has a variable working volume.

More specifically in accordance with this aspect of the invention, the reservoir includes a storage body having a fixed storage volume and a first inlet and exhaust means for allowing a compressible fluid to enter and leave the storage body. A second inlet and exhaust means is provided for allowing a substantially incompressible fluid to enter and leave the storage body. A first charge means is provided for pumping the compressible fluid into the storage body. A second charge means is provided for pumping the substantially incompressible fluid into the storage body to reduce the storage body fixed storage volume to a desired working volume into which the compressible fluid can be pumped by the first charge means.

In accordance with another aspect of the invention, the storage body comprises a substantially cylindrical body which is substantially vertically oriented and further comprises top and bottom end plates therefor and securing means for affixing said top and bottom end plates to said cylindrical body. Preferably, the top and bottom end plates each have a dished configuration to provide a greater thickness of material at the outer periphery of the respective plate than at its center.

In accordance with a further aspect of the invention, the reservoir further comprises a means for separating the compressible fluid from the substantially incompressible fluid.

In one embodiment, the means for separating comprises a flexible diaphragm secured in the cylinder body.

In another embodiment, the means for separating comprises a floating piston having top and bottom surfaces and a side periphery extending therebetween. The piston has a diameter which is smaller than a diameter of a bore of the cylinder so that a gap exists between the piston side periphery and a wall of the cylinder bore.

In accordance with yet another aspect of the invention, the floating piston includes a storage means for storing the substantially incompressible fluid.

In accordance with still yet another aspect of the invention, the compressible fluid is a neutral gas such as nitrogen. Preferably, the substantially incompressible fluid is a lubricant such as an oil or a grease.

In accordance with yet still another aspect of the invention, the cylinder body and the first and second end plates of the reservoir are so firmly secured to each other that the reservoir can withstand pressures up to 20,000 psi.

According to another aspect of the invention, an assembly is provided for pressurizing and storing gas.

In accordance with this aspect of the invention, the assembly comprises a gas supply container, a pump means for pressurizing gas, a first gas line which communicates the gas supply container and the gas pressurizing means, and a first valve means in the first gas line for controlling the flow of gas through the first gas line. The assembly further comprises a gas reservoir for storing the gas pressurized by the pump means with the gas reservoir having a fixed storage volume. A second gas line, which communicates the gas pressurizing means and the gas reservoir, is also provided. A second valve means is positioned in the second gas line for controlling the flow of gas in the second gas line. A substantially incompressible fluid charge means is provided for varying the amount of a substantially incompressible fluid in the gas reservoir thereby also varying a working volume of the reservoir into which gas can flow.

According to still another aspect of the invention, the assembly further comprises a sensor means for sensing the gas pressure in the gas reservoir.

According to yet another aspect of the invention, the substantially incompressible fluid is a lubricant and the substantially incompressible fluid charge means comprises a lubricant inlet and exhaust means communicating with the gas reservoir, a pump for pumping the lubricant, and a fluid line for communicating the pump with the lubricant inlet and exhaust means. A valve means is provided for allowing lubricant to selectively flow through the fluid line in either direction.

According to a further aspect of the invention, a process is provided for producing an injection molded product.

More particularly in accordance with this aspect of the invention, the process includes introducing a stream of molten plastic material into a mold space at a relatively constant first pressure. A quantity of gas is stored in a storage chamber at a second pressure which is at least as high as the first pressure. The gas is introduced into the stream of molten plastic material immediately after the molten material has passed the position at which the gas is introduced thereby forming a gas cavity in the molten material. The gas exerts pressure on the surrounding plastic material to urge the material toward the surfaces of the mold space. Molten plastic material continues to be fed to the mold space at the first pressure. The working volume of the storage chamber is enlarged while gas continues to be injected into the gas cavity thereby reducing the gas pressure in the storage chamber. The supply of molten material is thereafter terminated when the surfaces of the mold space are completely covered by the molten material. Gas continues to be fed to the gas cavity while the pressure within the gas cavity is reduced, as the plastic material cools, to a final pressure lower than the first pressure.

According to a still further aspect of the invention, the gas is introduced at a mold sprue. Preferably, the gas is a neutral gas such as nitrogen.

According to a yet further aspect of the invention, the gas is introduced at a pressure approximately between 2,000 psi. and 15,000 psi. Preferably, the first pressure is approximately 1,500 psi. while the second pressure is approximately 2,200 psi. and the final pressure is approximately 500 psi.

According to a still yet further aspect of the invention, a new and improved molded part produced by the above-recited process is provided.

One advantage of the present invention is the provision of a new fluid reservoir which has a fixed storage volume and a variable working volume.

Another advantage of the invention is the provision of a fluid reservoir in which a change in the working volume can be readily effected, in a substantially friction free manner.

A further advantage of the invention is the provision of a fluid reservoir which is capable of handling pressures up to 20,000 psi (137,900 kPa).

Still another advantage of the invention is the provision of a variable working volume fluid reservoir which can be provided with a means for separating a compressible fluid from a substantially incompressible fluid.

Yet another advantage of the present invention is the provision of a new process for producing an injection molded product.

A yet further advantage of the present invention is the provision of a process for producing an injection molded product that includes the steps of injecting gas at a relatively high pressure from a gas reservoir into a molten thermoplastic material to form a gas cavity therein and then increasing the working volume of the reservoir while continuing to inject gas from the reservoir into the gas cavity thereby rapidly reducing the pressure of the gas injected into the gas cavity.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein:

FIG. 3 is a reduced schematic view of the reservoir of FIG. 1 connected to a fluid circuit and a valve means of an injection molding machine; and, FIG. 4 is an enlarged cross-sectional view of a second type of compressible fluid charge means which can be utilized in the circuit of FIG. 3.

DETAILED DESCRIPTION OF THE PREFERRED AND ALTERNATE EMBODIMENTS

Figure 2:
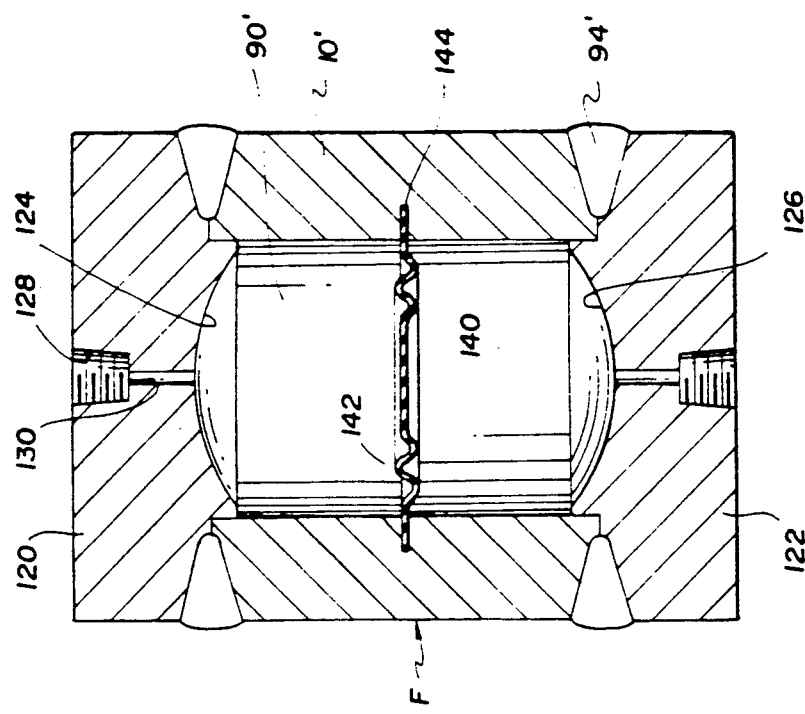
FIG. 2 is a cross-sectional view of a fluid reservoir according to a first alternate embodiment of the present invention.

Referring now to the drawings wherein the showings are for purposes of illustrating preferred and alternate embodiments of the invention only and not for purposes of limiting same, FIG. 3 shows the subject new fluid reservoir A as utilized in a circuit which also includes a compressible fluid charge means B and an incompressible fluid charge means C. While the fluid reservoir is primarily designed for use in conjunction with the provision of a quantity of gas for a gas injection molding machine, it will be appreciated that the overall inventive concept involved could be adapted for use in many other environments which utilize a compressible fluid.

Figure 1:
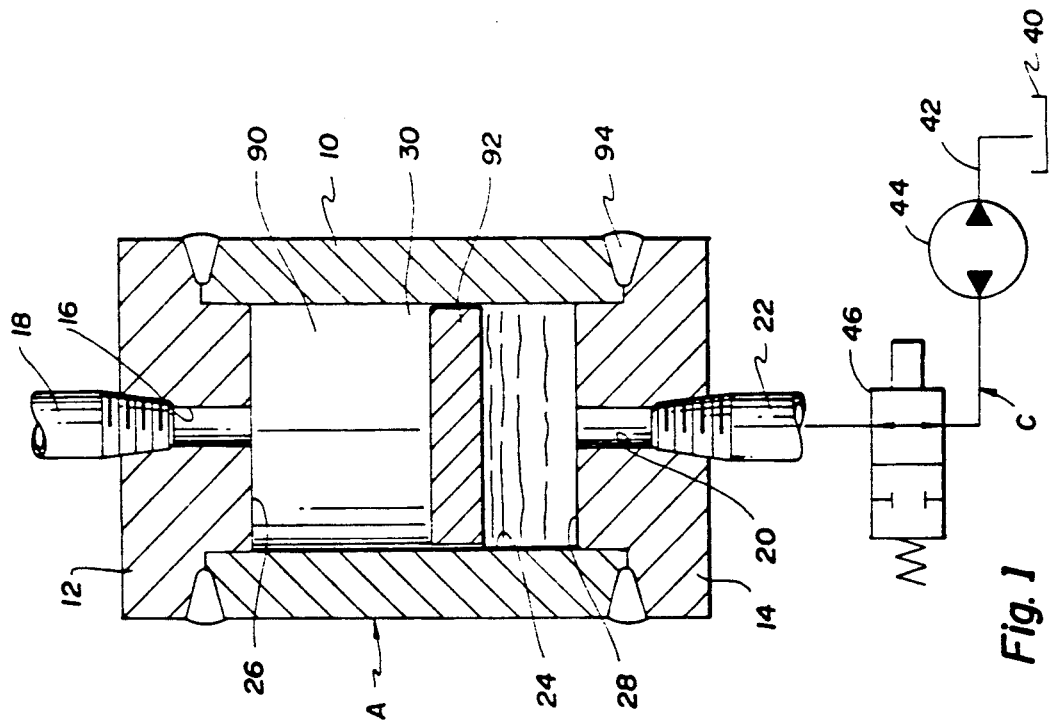
FIG. 1 is a cross-sectional view of a fluid reservoir according to a preferred embodiment of the present invention.

More particularly, and with reference to FIG. 1, the present invention includes a storage body or reservoir A which comprises a cylinder body 10 having top and bottom end plates 12, 14 respectively. A bore 16 extends through the top end plate 12 and a suitable conventional conduit 18 is secured in the bore so as to be in fluid communication with the interior of the cylinder body. A similar bore 20 extends through the bottom end plate 14 and a suitable conventional conduit 22 is secured in the bore so as to afford communication with the interior of the cylinder. The cylinder has a cavity defined by an interior wall 24 which, together with an inner surface 26 of the top end plate and an inner surface 28 of the bottom end plate defines a fixed storage volume 30 in the cylinder. The storage volume is capable of receiving and storing a fluid. The size of the fixed storage volume 30 can, however, be reduced through the use of the incompressible fluid charge means C.

With continuing reference to FIG. 1, a suitable conventional incompressible fluid storage tank 40 has extending thereinto a fluid line 42 which communicates the tank 40 with the conduit 22 leading through the bottom end plate 14. Positioned in the line 42 is a conventional fluid pump 44 as well as a conventional valve 46 which controls the flow of the incompressible fluid through the line 42. The pump can be a uni-directional fixed displacement hydraulic pump as illustrated or any other suitable conventional type of hydraulic pump. The valve 46 can be a three position valve having a center blocked position as is illustrated. The valve can be actuated open in either direction by a solenoid and resiliently biased to the center closed position as illustrated. However, it should be recognized that any other suitable type of conventional valve, such as a manually actuated valve, may be utilized in the fluid line 42 as desired. When the pump 44 is actuated, a substantially incompressible fluid such as a lubricant, for example an oil or a grease, can be pumped into the cylinder body 10 so as to occupy a portion of the fixed storage volume 30.

With reference now to FIG. 3, the circuit further comprises a compressible fluid reservoir 60 which communicates with a fluid line 62. A suitable conventional shut-off valve 64 is positioned in the fluid line 62 adjacent the compressible fluid reservoir in order to regulate the outflow of compressible fluid from the reservoir. Also positioned in the fluid line 62 is a first check valve 66 to prevent reverse flow back into the reservoir 60. Leading from the fluid line 62 is a branch 68 which communicates with the compressible fluid charge means B. Preferably, the charge means comprises a suitable piston and cylinder pumping assembly including a cylinder 70 in which a piston 72 is adapted to reciprocate and a suitable conventional actuation means 74 for reciprocating the piston 72 in the cylinder 70 so as to pressurize the compressible fluid which flows into the cylinder 70 from the compressed fluid reservoir once the valve 64 is open.

After the compressible fluid is pressurized, it can flow further downstream in the fluid line 62 past a second check valve 80 but it cannot flow back through the first check valve 66. A suitable conventional fluid pressure sensor 82 is positioned downstream of the second check valve 80 to provide a reading of the fluid pressure in that portion of the fluid line 62. The continued flow of pressurized fluid through line 62 is regulated by a shut-off valve 84 which is preferably air-operator actuated as illustrated. A branch 86 leads from the fluid line 62, before the shut-off valve 84, to the reservoir A. This branch 86 is in fluid communication with the conduit 18 that extends through the top end plate 12 of the storage body or reservoir as illustrated in FIG. 1. In this way, fluid which has been pressurized by the charge means B to a pressure higher than that of the fluid in the compressed fluid reservoir 60 can be stored in the reservoir A.

With reference now again also to FIG. 1, once a bottom section of the fixed storage volume 30 of the reservoir A has been filled with a substantially incompressible fluid, the compressible fluid can only flow into a working volume 90 defined in the reservoir. The working volume is smaller than the fixed storage volume 30 by an amount depending on the quantity of incompressible fluid pumped into the storage volume 30.

If desired, a means for separating, at least substantially, the compressible fluid, i.e. the gas, from the incompressible fluid, i.e. the lubricant, can be provided. In one embodiment, a floating piston or disk 92 can be provided in the cylinder to reduce turbulence and the mixing of the lubricant with the gas. The disk 92 can be made of a sintered metal or the like so that it serves not only as a means for separating but also as a storage means which can absorb a certain amount of the lubricant. Preferably, the disk has a loose fit within the cylinder bore such that the disk has a smaller diameter than the diameter of the cylinder bore. In this way, a gap exists between a side periphery of the disk, and a wall of the cylinder bore to allow the lubricant and the gas to flow through the gap and prevent any type of hang-up by the disk in the cylinder bore.

The cylinder body 10 and the top and bottom end plates 12, 14 can be secured to each other by a suitable securing means such as weld beads 94 which are illustrated in FIG. 1 in order to enable the reservoir to withstand fairly high pressures. Preferably, the reservoir can withstand pressures up to approximately 20,000 psi (137,900 kPa). The reservoir A can have a storage volume capacity of approximately 5 to 50 cubic inches (82 to 819 cm3).

With reference now again to FIG. 3, the adjustable working volume compressible fluid reservoir of the present invention is useful in providing a compressible fluid such as a gas in a gas injection molding system. In this connection, the fluid line 62 is in fluid connection with a nozzle means D that comprises a housing 100 having a core portion 102. The core portion has a bore 104 extending therethrough. A check valve 106 is provided in a bore 108 in the housing 100. The core portion bore 104 is in fluid communication with the housing bore 108 which, in turn, is in fluid communication with the fluid line 62.

In a first type of use, the valve 46 is opened and the pump 44 is activated to allow a quantity of a substantially incompressible fluid e.g., a lubricant, such as oil or grease, to be pumped from the reservoir 40 into the cylinder body 10. This pushes the disk 92 upwardly. The quantity of oil or grease which is allowed to enter the cylinder is only enough to decrease the working volume 90 of the cylinder to a desired predetermined volume. This is chosen to be a volume at which the gas, when compressed to a predetermined initial pressure, is able to penetrate the molten plastic injected by a suitable conventional plastic injection molding machine to form a gas cavity therein. The volume is also so chosen that the gas is at a predetermined final pressure when the mold is full and the injection of thermoplastic material is finished.

If too much grease or oil enters the cylinder A, one needs merely to energize the valve 46, and utilize the pressure of the gas in the reservoir A in order to force the lubricant back into the reservoir 40 in any suitable manner until the correct amount of lubricant is left in the cylinder. Alternatively, if the pump were to be a bi-directional type pump, one could energize the pump in the opposite direction, once the valve were open, and pump the oil out.

With continuing reference to FIG. 3, the valve 64, which may be a pressure reducing valve, is opened to allow gas to flow from the storage tank 60, which can be a commercially available tank of nitrogen gas or the like, through the first check valve 66 and the second check valve 80 to the storage body or reservoir A and the compressible fluid charge means B. The gas which is in the compressible fluid charge means B is pressurized by pushing the piston 72 upwardly therein. This pressurizes the gas in the cylinder 70 and urges it back into the fluid line 62 through which it flows into the reservoir A through the branch 86 since it cannot flow back through the check valve 66 and flow in a forward direction through the fluid line 62 is prevented by the closed valve 84 therein. When the piston 72 has reached its uppermost position, it trips a conventional limit switch (not shown) and the piston is reversed and moves downwardly drawing in another load of gas to be pressurized. When the piston 72 reaches its lowermost position, it again trips a limit switch and the piston is now again caused to move upwardly compressing the gas in the cylinder 70.

The cycle is repeated until the sensor 82 indicates that the pressure of the gas stored in the reservoir A is high enough for the particular type of gas injection molding to be done. Since the working volume 90 of the reservoir A has been reduced to the correct amount, the correct predetermined volume of gas will thus be stored in the reservoir.

At a given signal, the directional valve 84 is opened thereby allowing gas to flow through the fluid line 62 into the housing bore 108 and through the core portion bore 104 into a mold chamber E. This reduces the pressure of the gas in the storage chamber A over time as more and more gas flows out of it until the pressures in a gas cavity 110 in the thermoplastic material in the mold chamber E and in the reservoir A are equalized.

Another type of use of the reservoir in a gas injection molding process enlarges the working volume of the reservoir during the injection molding process. In this method, a stream of molten plastic material is introduced at a first approximately constant pressure into a mold space. A quantity of gas is stored in the working volume 90 of the reservoir A at a second pressure which is at least as high as the first pressure. The gas is then introduced into the stream of molten plastic material immediately after the molten material has passed the position at which the gas is introduced thereby forming a gas cavity in the molten material. The gas exerts pressure on the surrounding plastic material to urge the plastic toward the surfaces of the mold space. As molten plastic material continues to be introduced into the mold space, the working volume of the reservoir A is enlarged while gas continues to be introduced into the molten material.

With reference now to FIG. 3, the working volume 90 of the reservoir A can be increased by actuating the valve 46 to its return position and by allowing the pressure of the gas in the working volume 90 to urge the lubricant out of the reservoir A and back into the lubricant reservoir 40. Alternatively with a bi-directional pump, after the valve is actuated, the pump can be used to begin pumping the lubricant out of the reservoir A and back into the lubricant reservoir.

This reduces the gas pressure in the reservoir at a fairly rapid rate. It has been found that while a high initial gas pressure is necessary to begin the formation of the gas cavity in the molten thermoplastic material, a considerably lower gas pressure is all that is necessary to continue the enlargement of such gas cavity. Additionally, it has been found that such considerably lower gas pressure is advantageous since gas at such pressure will not have a tendency to blow completely through the molten thermoplastic during the injection molding process. Such a blow through is highly disadvantageous since it leads to the formation of a defective injection molded product which has to be scrapped.

Subsequently, the supply of molten material is terminated when the surfaces of the mold space are completely covered by the molten material. However, gas flow from the reservoir to the gas cavity in the mold space can continue as necessary. The pressure of such gas is, however, continually reduced, as the plastic material cools, to a final pressure. The gas final pressure can be lower than the initial pressure at which the thermoplastic material was introduced into the mold cavity.

In one embodiment, the initial pressure at which the thermoplastic material is injected into the mold cavity is approximately 1,500 psi. The pressure at which the gas is stored in the reservoir is approximately 2,200 psi. initially. It is at this pressure that the gas is introduced into the mold cavity to begin the formation of a gas cavity therein. As the size of the reservoir is increased, the gas pressure decreases until, finally, a final gas pressure of approximately 500 psi. is reached after the thermoplastic material has cooled down in the mold cavity.

Alternatively, it can be seen that if only a small amount of gas is needed for a particular application, the compressible fluid pressurizing means B can itself be utilized as the reservoir of the system. In this version of the invention, a suitable volume of gas is allowed to flow out of the gas storage chamber 60 and into the cylinder 70 of the compressible fluid pump B at a pressure of approximately 500–1,500 psi (3,448–10,343 kPa). Then, the piston 72 in the cylinder chamber is advanced to pressurize the gas therein to a pressure of approximately 2,200 psi (15,169 kPa). In order to prevent the gas from flowing through the branch 86 and into the reservoir A, a suitable valve (not illustrated) can be provided in the branch. When the gas in the cylinder 70 has been pressurized to the required extent, the valve 84 can be opened to allow the gas to flow through the nozzle means D.

Subsequently, when the pressurized gas has begun to form the gas cavity 110 in the thermoplastic material in the mold space, the piston 72 can be withdrawn in the cylinder 70 to reduce the gas pressure therein. The molten thermoplastic continues to be fed into the mold cavity at a pressure of approximately 1,500 psi. (10,343 kPa) at the mold screw (but a considerably lower pressure at the mold sprue due to the high viscosity of the thermoplastic) while the pressure at which the gas is fed into the gas cavity formed in the molten thermoplastic continues to decrease. The final pressure in the gas cavity may be on the order of approximately 500 psi. (3,448 kPa).

With reference now to the alternate embodiment of FIG. 2, the invention is there illustrated as utilizing a second type of reservoir F. For ease of illustration and appreciation of this alternative, like components are identified by like numerals with a primed (') suffix and new components are identified by new numerals.

In this FIGURE, the reservoir comprises a cylinder body 10' having top and bottom end plates 120, 122. Each end plate is provided with a dished out configuration. In other words, the respective inner surface 124, 126 of each plate is somewhat curved so that the material is thinner at the center of the plate than around its edges where it meets the cylinder body 10'. It is believed that the provision of curved surfaces adjacent the outer periphery of each end plate is advantageous in that the plates will thus be urged by the fluid pressures inside the storage body storage volume 30' more tightly against the cylinder body 10' at the joints thereof to seal such joints against leakage of either of the fluids out of the storage reservoir F.

As in the embodiment of FIG. 1, the cylinder body 10' is secured, such as by weld beads 94' to the top and bottom end plates 120, 122. Each of the end plates is also provided with first and second bores 128, 130 which communicate with each other and together extend transversely through the end plate. The first bore 128 is adapted to threadedly receive a suitable conventional conduit (not illustrated). The second bore 130 is of a smaller diameter to provide yet more strength for the end plate while still allowing the fluid to flow therethrough. The other end plate 122 is similarly provided with suitable bores.

A diaphragm 140, made of a resilient material such as plastic or rubber, can be secured in the reservoir F if desired. The diaphragm can be provided with suitable folds 142 to enable the diaphragm to stretch more easily and accommodate the desired amount of substantially non-compressible fluid while enlarging or reducing the size of the working volume 90' of the reservoir as desired. The diaphragm can be secured by suitable conventional securing means such as a lip 144 in a groove 146 provided on an inner periphery of the cylinder body 10'.

With reference now to the alternate embodiment of FIG. 4, the invention is there illustrated as utilizing a second type of compressible fluid charge means G. For ease of illustration and appreciation of this alternative, like components are identified by like numerals with a double primed (") suffix and new components are identified by new numerals.

In this FIGURE, the compressible fluid charge means that is positioned in the fluid line 62" is similarly positioned between a pair of check valves 66" and 80". The charge means G is a diaphragm pump which comprises a pump body 160 having therein a diaphragm 162 which is reciprocated in a cavity 164 by a hydraulic fluid pumped by a piston 166. A desired volume of hydraulic fluid is urged through a fluid line 168 into a chamber 170 so that it can be acted on by the piston 166. The piston pushes the hydraulic fluid upwardly out of the chamber 170 and against a bottom surface of the diaphragm 162 to urge the diaphragm upwardly in the cavity 164 of the pump body 160 thereby pressurizing a gas contained in the cavity above the diaphragm. One such suitable diaphragm pump is manufactured by Pressure Products Industries of Warminster, Pennsylvania. The diaphram pump G can be used in place of the piston type pump B in order to pressurize the gas to a suitable pressure so that it can be stored in the reservoir.

One advantage of utilizing the charge means G of this embodiment would be in a situation where more than one reservoir needs to be pressurized at the same time. The diaphragm pump is capable of supplying pressurized gas for up to four reservoirs simultaneously, if desired.

EXAMPLE NO. 1

A granular 20% chalk filled polypropylene plastic was loaded at room temperature into the hopper of a two stage extruder. The extruder contained a 3½ inch (8.9 cm.) diameter screw with an 1:d=24:1. The plastic material was plasticated by the extruder screw running at 30 rpm with 200 psi. (approximately 14 bars) back pressure.

A part which was to be molded had a varying wall section from 1.5 mm to 25 mm (0.059 to 0.984 in) in thickness and was 46 inches (116.8 cm.) long by 13 inches (33 cm.) wide and 12 (30.5 cm.) inches high. The part weight of plastic was to be 2,377 grams (83.8 oz).

From the accumulator, resin was shot at a temperature of 460° F. (238° C.) into a mold cavity having the requisite 46"×13"×12" volume. The mold was maintained at 75° F. (24° C.).

Nitrogen gas injection started after an injection stroke of 0.125 inches (0.318 cm.). Gas stored in a cylinder at approximately 2,200 psi. (152 bars) was introduced through a directional valve to the plastic being injected. The injection time for the plastic was 7 seconds and at the end of the plastic injection, gas pressure had decreased to approximately 1,100 psi. (76 bars). The gas pressure was held at approximately 75 bars for 60 seconds and was then released to a lower value of approximately 15 to 45 psi. (1 to 3 bars). At this point, the mold could be opened and the completed part removed.

The final product had a dimension of 46×13×12 inches. The product had a solid integral shell with a plurality of hollow channels therein in the thicker, ribbed areas of the product.

EXAMPLE NO. 2

This example is the same as the first with the exception that after the gas had been initially introduced to the plastic being injected, and as the gas continued to be injected the gas storage reservoir's working volume was expanded thereby reducing the gas pressure therein. This step also reduced the final pressure in the molding to approximately 40 bars (580 psi.). The resulting molding was found to be of equal quality to the higher holding pressure of Example No. 1.

Expansion of the working volume of the gas storage reservoir was accomplished by storing the gas in the fluid pump B. With reference now to FIG. 3, after decoupling the reservoir A from the fluid line 62, the gas pressurized in the pump B will remain in the pump and the line 62 downstream from the check valve 66 until the valve 84 is opened. Once the valve 84 is opened and the gas begins to flow out of the cylinder comprising the pump, the piston 72 thereof is retracted to increase the working volume of the cylinder thereby rapidly decreasing the pressure of the gas in the cylinder.

EXAMPLE NO. 3

This example is again the same as the first example except that the starting or initial gas pressure was reduced from approximately 150 bars or 2,200 psi. to approximately 130 bars or 1885 psi. This reduction in initial gas pressure resulted in the gas not being able to break into the molten plastic mass to create a gas cavity therein during the plastic injection molding process. The resultant molding therefore had no gas cavity therein and the mold cavity was therefore not completely filled with the injected molten plastic. Consequently, the molded part which was produced had to be scrapped.

EXAMPLE NO. 4

This example is also the same as the first example except that the initial gas pressure was increased from approximately 150 bars or 2,200 psi. to approximately 200 bars or 2,900 psi. This increase in initial gas pressure resulted in the gas breaking completely through the molten plastic mass causing a blowout of the gas into the mold cavity. The resultant molding therefore had a gas channel extending therethrough which caused the mold cavity to be incompletely filled with the molten plastic. The molded part produced consequently had to be scrapped. From examples 3 and 4, it can be seen that the starting gas pressure is critical in determining whether a gas cavity is formed in the molten plastic material and thus whether a usable molded part is produced. However, the starting gas pressure will vary with the type of plastic which is injection molded and, perhaps, with other factors as well.

Although the above examples utilized polypropylene, it should be evident that other types of plastic materials could also be utilized such as polyvinylchloride (PVC), polycarbonate, polysulfone, polystyrene, polyethylene, ABS, and the like as is desired or required for a particular type of environment. With each of these plastics, however, a different set of parameters is necessary for the pressure and volume of the gas being injected as well as for the temperature of the plastic being injected.

The subject invention thus provides a compressible fluid reservoir having a variable working volume. Such a variable working volume is necessary when different predetermined amounts of gas need to be pressurized to different predetermined pressures for gas pressurized plastic injection molding when utilizing different types of plastic and when the injection mold has various different shapes. In this connection, certain plastics such as polyvinylchloride (PVC) require a gas of a predetermined volume at a relatively low pressure. On the other hand, other types of plastics such as ABS and the like require gas at a higher pressure and require different volumes of gas than does PVC or similar types of plastics. The present invention provides a reservoir in which a simple, fast, and relatively friction free change in the working volume can be accomplished as required instead of having to resort to providing various sizes of fixed volume reservoirs.

The invention has been described with reference to preferred and alternate embodiments. Obviously, alterations and modifications will occur to others upon a reading and understanding of this specification. It is intended to include all such alterations and modifications insofar as they come within the scope of the appended claims or the equivalents thereof.

What is claimed is:

1. A compressible fluid reservoir having a variable working volume, comprising:
   a storage body having a fixed storage volume;
   a first inlet and exhaust means for allowing a compressible fluid to enter the storage body and to leave said storage body at a predetermined initial first pressure and at a fluid pressure substantially reduced from the initial fluid pressure;
   a second inlet and exhaust means for allowing a substantially incompressible fluid to enter and leave said storage body;
   a first charge means for pumping the compressible fluid into said storage body;
   a second charge means for pumping the substantially incompressible fluid into said storage body to reduce said storage body fixed storage volume to a desired working volume into which the compressible fluid can be pumped by said first charge means wherein the storage body stores the compressible fluid in the desired working volume at the predetermined initial fluid pressure approximately between 2,000 psi and 15,000 psi; and
   means for enlarging said storage body fixed storage volume in response to the substantially reduced fluid pressure.

2. The reservoir of claim 1 wherein said storage body comprises a substantially cylindrical body which is substantially vertically oriented and further comprises top and bottom end plates therefor and securing means for affixing said top and bottom end plates to said cylindrical body.

3. The reservoir of claim 2 wherein said top and bottom end plates each have a dished configuration to provide a greater thickness of material at an outer periphery of the respective plate than at its center.

4. The reservoir of claim 2 further comprising a means for separating the compressible fluid from the substantially incompressible fluid.

5. The reservoir of claim 4 wherein said means for separating comprises a floating piston having top and bottom surfaces and a side periphery extending therebetween, said piston having a diameter smaller than a diameter of a bore of said cylinder so that a gap exists between said piston side periphery and a wall of said cylinder bore.

6. The reservoir of claim 5 wherein said piston includes a storage means for storing the substantially incompressible fluid.

7. The reservoir of claim 4 wherein said means for separating comprises a flexible diaphragm secured in said cylinder body, said diaphragm serving as a boundary between the compressible fluid and the substantially incompressible fluid.

8. The reservoir of claim 1 wherein the compressible fluid is a neutral gas such as nitrogen.

9. The reservoir of claim 1 wherein the substantially incompressible fluid is a lubricant such as an oil.

10. The reservoir of claim 1 wherein the substantially incompressible fluid is a lubricant such as a grease.

11. An assembly for pressurizing and storing gas, comprising:
    a gas supply source for supplying a gas;
    a pump means for pressurizing the gas;
    a first gas line which communicates said gas supply container and said gas pressurizing means;
    a first valve means in said first gas line for controlling the flow of gas through said first gas line;
    a gas reservoir for storing the gas pressurized by said pump means, said reservoir having a fixed storage volume;
    a second gas line which communicates said gas pressurizing means and said gas reservoir;
    a second valve means in said second gas line for controlling the flow of gas in said second gas line;
    a substantially incompressible fluid charge means for varying the amount of a substantially incompressible fluid stored in said gas reservoir fixed storage volume thereby also varying a working volume of the reservoir into which the gas can flow; and,
    means for enlarging the working volume of the reservoir in response to a substantial decrease in pressure of the gas in the working volume of the reservoir.

12. The assembly of claim 11 wherein said reservoir comprises:
   a substantially vertically oriented cylinder body having first and second ends and a bore which extends therebetween;
   a first end plate for sealing said cylinder first end, said first end plate including a first inlet and exhaust means for allowing gas to enter and leave said cylinder through said first end plate; and,
   a second end plate for sealing said cylinder second end, said second end plate including a second inlet and exhaust means for allowing the substantially incompressible fluid to enter and leave said cylinder through said second end plate.

13. The assembly of claim 12 wherein said substantially incompressible fluid is a lubricant and wherein said substantially incompressible fluid charge means comprises:
   a pump for pumping the lubricant;
   a fluid line for communicating said pump with said second inlet and exhaust means; and,
   a valve means for allowing lubricant to selectively flow through said fluid line in either direction.

14. The assembly of claim 12 wherein said reservoir further comprises a means for separating the gas and the substantially incompressible fluid.

15. The assembly of claim 11 wherein said reservoir is so designed that it can withstand pressures up to 20,000 psi.

16. The assembly of claim 11 further comprising a sensor means for indicating the gas pressure in said reservoir.

17. A method for providing a reservoir with a variable working volume to enable to predetermined amount of gas, having a desired initial pressure and a desired final pressure substantially reduced from the desired initial pressure, to be delivered from the reservoir, said method comprising:
   providing a reservoir having an interior storage chamber of a set initial volume, the reservoir having a first end including a gas inlet and exhaust means and a second end including a lubricant inlet and exhaust means;
   pumping a predetermined amount of lubricant into the reservoir through said lubricant inlet and exhaust means to reduce the reservoir storage chamber initial volume to a desired working volume;
   subsequently blocking the flow of lubricant through said lubricant inlet and exhaust means to trap lubricant in the reservoir;
   pumping a gas into the reservoir through said gas inlet and exhaust means;
   ceasing the pumping of gas when said gas in the reservoir working volume is at a desired first pressure the desired initial pressure being approximately between 2,000 and 15,000 psi; and
   enlarging the working volume of the reservoir in response to the desired final pressure.

18. The method of claim 17 further comprising the step of venting gas out of the reservoir until the gas remaining in the reservoir reaches a desired second pressure.

19. The method of claim 17 further comprising the step of minimizing turbulence and mixing at a gas lubricant interface in the reservoir.

20. The method of claim 17 wherein said step of enlarging comprises the subsidiary steps of:
   unblocking the flow of lubricant through said lubricant inlet and exhaust means to allow lubricant to flow out of the reservoir;
   urging said lubricant out of the reservoir; and,
   subsequently blocking the flow of lubricant through said lubricant inlet and exhaust means.

* * * * *